(12) United States Patent
Carlson et al.

(10) Patent No.: US 7,661,947 B2
(45) Date of Patent: Feb. 16, 2010

(54) METHOD AND APPARATUS FOR MOLDING ROOFING PRODUCTS WITH BACK GATING

(75) Inventors: Dennis Carlson, Lamar, MO (US); Dan Robinson, Bolivar, MO (US)

(73) Assignee: Epoch Composite Products, Inc., Joplin, MO (US)

( * ) Notice: Subject to any disclaimer, the term of this patent is extended or adjusted under 35 U.S.C. 154(b) by 691 days.

(21) Appl. No.: 11/283,627

(22) Filed: Nov. 21, 2005

(65) Prior Publication Data

US 2007/0114698 A1  May 24, 2007

(51) Int. Cl.
*A21C 11/00* (2006.01)
*A23P 1/00* (2006.01)
*A21C 3/00* (2006.01)
*B28B 11/00* (2006.01)
*B28B 13/00* (2006.01)
*B29B 11/06* (2006.01)
*B29C 35/00* (2006.01)
*B29C 45/00* (2006.01)
*B28B 7/00* (2006.01)

(52) U.S. Cl. .................. 425/236; 425/556; 425/571; 425/443

(58) Field of Classification Search ............. 425/116, 425/121, 128, 542, 567, 572, 588, 236, 556, 425/568, 571, 436, 438, 441, 443, 444, 436 RM, 425/DIG. 806; 264/161
See application file for complete search history.

(56) References Cited

U.S. PATENT DOCUMENTS 5,435,956 A * 7/1995 McCrory ............... 264/161
5,656,226 A * 8/1997 McVicker .............. 264/318
5,753,155 A * 5/1998 Hanusa ................. 264/46.5
5,962,042 A * 10/1999 Konno .................. 425/542

(Continued)

FOREIGN PATENT DOCUMENTS

DE  10110611 A1 * 11/2002
JP  57072840 A  * 5/1982
JP  06143368 A  * 5/1994

*Primary Examiner*—Joseph S Del Sole
*Assistant Examiner*—Ryan Ochylski
(74) *Attorney, Agent, or Firm*—Shook, Hardy & Bacon LLP

(57) ABSTRACT

A molding apparatus is configured with a distribution channel configured to deliver a blended feed composition directly into an article molding region such that a molded article is formed with gating on the bottom surface of the article. The article molding regions are formed into front sides of opposed "A" and "B" surface mold tools that, when moved into a mating relationship with one another, form closed molding cavities within which molded articles are generated from molding material feed. The article molding regions each generally have a body bounded by a perimeter that establishes an outer edge for an article molded in the one of the closed molding cavities. Additionally, the body of each article molding region of the "A" surface mold tool is adapted for molding a bottom surface for the composite article, and the body of the article molding region of the "B" surface mold tool is adapted for molding a top surface for the composite article. The distribution channel is formed in at least the second surface mold tool, and has a main portion and a downstream terminus for each article molding region of the "A" surface mold tool. The main portion of the distribution channel is formed outside of each article molding region. The downstream terminus, to which the main portion extends, is in communication with the body of the respective article molding region of the "A" surface mold tool.

4 Claims, 3 Drawing Sheets

U.S. PATENT DOCUMENTS

| | | | |
|---|---|---|---|
| 6,139,309 A * | 10/2000 | Kotaki | 425/542 |
| 6,228,303 B1 * | 5/2001 | Voelkel | 264/161 |
| 6,248,271 B1 * | 6/2001 | Graham et al. | 264/39 |
| 6,315,543 B1 * | 11/2001 | Lausenhammer et al. | 425/139 |
| 6,379,143 B1 * | 4/2002 | Kotaki | 425/542 |
| 6,652,263 B2 * | 11/2003 | Persson | 425/556 |
| 6,773,250 B2 * | 8/2004 | Wilsterman et al. | 425/174.2 |
| 7,261,853 B2 * | 8/2007 | Sutter | 264/318 |
| 2004/0058031 A1 * | 3/2004 | Niewels | 425/549 |
| 2004/0178532 A1 * | 9/2004 | Jolitz et al. | 264/151 |
| 2004/0208949 A1 * | 10/2004 | Niewels | 425/549 |

* cited by examiner

METHOD AND APPARATUS FOR MOLDING ROOFING PRODUCTS WITH BACK GATING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Conventional injection molding processes have been modified to create composite building products that combine polymers with filler materials. For instance, composite shingles have been fabricated in a closed molding process utilizing various combinations of polymers, such as rubber and thermoplastics (e.g., polyolefins, polyvinyl chloride, etc.) and fillers (e.g., glass, stone, limestone, talc, mica, cellulosic materials such as wood flour, rice hulls, etc.), along with colorants, and optionally, suitable UV inhibitors, lubricants and other additives that aid in the molding process and provide favorable physical properties to the finished composite shingles. Two popular types of composite shingles formed in a closed molding process including composite shake shingles and composite slate shingles. Different mold tools are created for each type of composite shingle, each with its own surface texturing or contouring to be imparted to the molded article.

A molding apparatus for creating composite building products generally includes opposed mold tools that combine to form one or more closed molding cavities. While the mold tools are in contact with one another to form the cavities, one of the tools shapes a top surface of the composite building product, and the other tool shapes the bottom surface of the product. Additionally, one or both of the tools in cooperation shapes the side or outer edge of the composite building product. Typically, to deliver the material to be molded to the closed molding cavities, a heated, flowable blended composition of a polymer and a filler is moved under pressure from a port in one or both of the opposed molding tools to a distribution channel formed by the mating mold tools. The distribution channel is formed into the surfaces of the mold tools that face one another, in a similar fashion to the closed molding cavities, and extends from the port to the article molding regions of each mold tool that form the closed molding cavities. More specifically, the distribution channel extends to a perimeter edge of each article molding region where the flowable composition is delivered into the closed molding cavities. The composition is then cured in each cavity under pressure for a sufficient period of time to form the molded article as a composite building product. Subsequently, the mold tools are separated and the molded articles removed.

The use of a distribution channel on the mold tool surfaces creates a molded gating waste piece that must be discarded. Because of the distribution channel configuration, the gating piece extends from the side or outer edge of the molded article. Although removal of the gating piece from the molded article is generally not difficult, a vestige is left behind as evidence that the gating piece was once attached to the article. This vestige is undesirable on either the side edge or the top surface of the molded article, as these surfaces may remain exposed after the composite building product is installed on a structural member (e.g., a composite shingle on a roof). It would be desirable to create a composite building product free of a vestige or other mark that is a by-product of the molding process on the side edge or the top surface of the molded product.

SUMMARY OF THE INVENTION

A molding apparatus is provided for forming one or more molded articles by delivering a blended feed composition to an article molding region so that a gating piece is formed on the bottom surface of the molded articles. In this way, the exposed top surface and side edge of the article is free of a vestige of the molding process upon removal of the gating piece.

In one aspect, the molding apparatus includes opposed "A" and "B" surface mold tools each having front sides within which are formed one or more article molding regions. The article molding regions of the "A" surface mold tool are aligned to mate with the article molding regions of the "B" surface mold tool, such that when the mold tools are brought together, one or more closed molding cavities are formed within which molded articles are generated from a blended feed composition of a polymer and a filler. The article molding regions each generally have a body bounded by a perimeter that establishes an outer edge for the article molded in each of the closed molding cavities. Furthermore, the body of each article molding region of the "A" surface mold tool is adapted for molding a bottom surface for the composite article, and the body of each article molding region of the "B" surface mold tool is adapted for molding a top surface for the composite article. A distribution channel is formed in at least the second surface mold tool, and has a main portion and a downstream terminus for each article molding region of the "A" surface mold tool. The main portion of the distribution channel is formed outside of each article molding region. The downstream terminus, to which the main portion extends, is in communication with the body of the respective article molding region of the "A" surface mold tool. This configuration facilitates the formation of a gating piece on the bottom surface of each molded composite article while the outer edge of each article is free from attachment with the gating piece. Thus, when the gating piece is removed, the vestige is only evident on the bottom surface of the article.

To facilitate removal of the molded composite article, the "A" surface mold tool, in another aspect, is formed of a base and one or more lifters. A lifter is provided for each article molding region, and has the distribution channel formed therein so that the main portion of the channel is hidden from the closed molding cavity and only the downstream terminus is exposed to the cavity. After the article has been molded in the closed molding cavity for a necessary period of time, the "A" and "B" surface mold tools separate, and each lifter is displaced away from the base to reveal the main portion of the distribution channel and expose the gating piece so that the molded article and attached gating piece may be removed from the molding apparatus to a location where the gating piece may be separated from the finished article.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWINGS

In the accompanying drawings, which form a part of the specification and are to be read in conjunction therewith and in which like reference numerals are employed to indicate like parts in the various views.

DETAILED DESCRIPTION OF THE INVENTION

Figure 1:
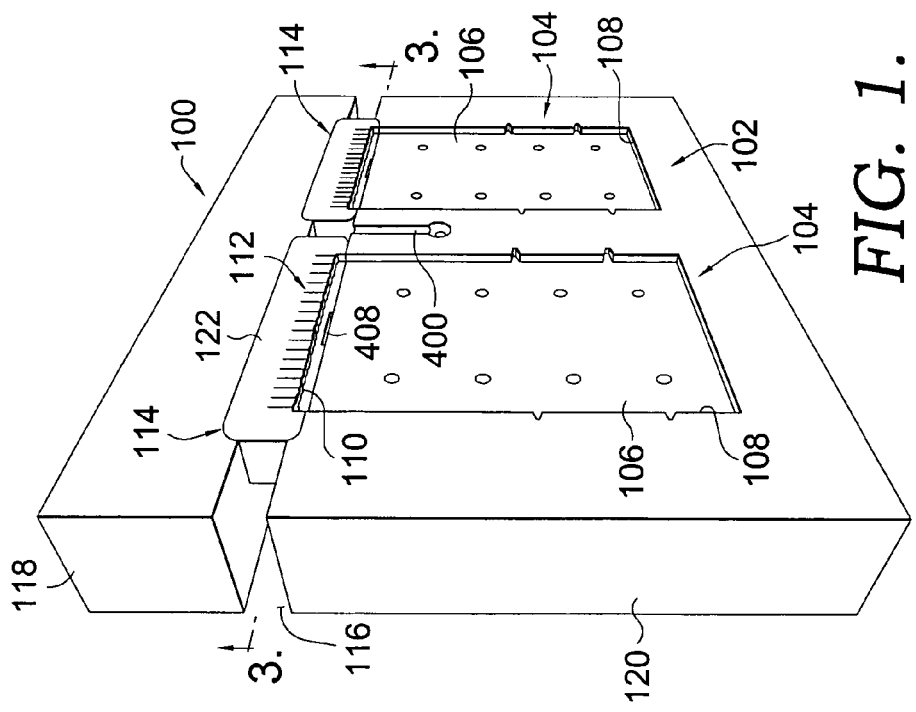
FIG. 1 is a perspective view of one embodiment of an "A" surface mold tool having article forming regions for forming the bottom surface of molded composite articles.
Figure 4:
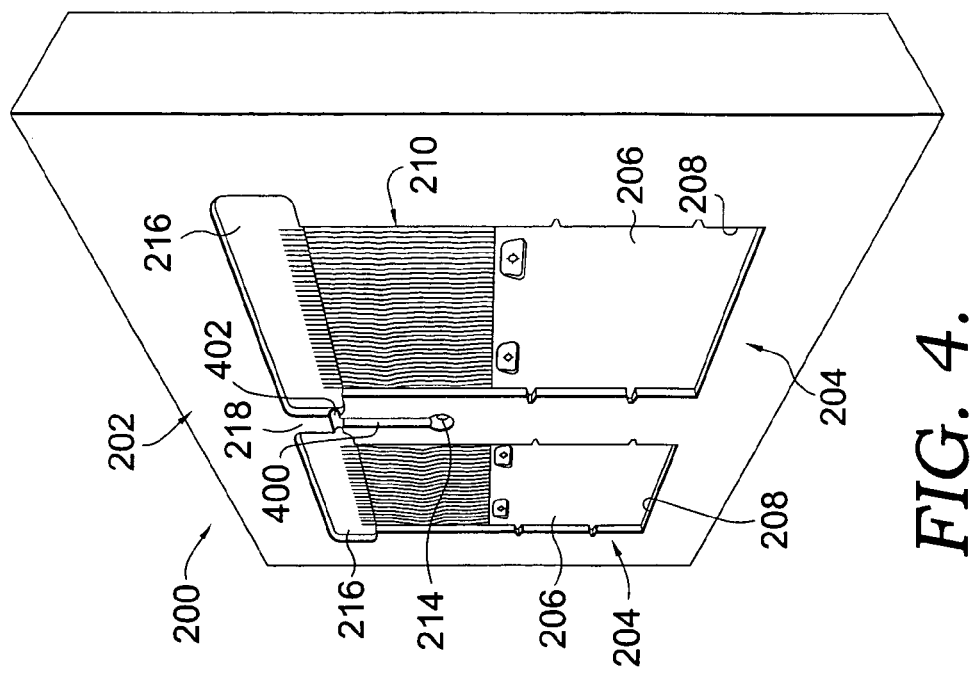
FIG. 4 is a perspective view of one embodiment of a "B" surface mold tool having article forming regions for forming the top surface of molded composite articles.

Illustrated in FIGS. 1 and 4 are an "A" surface mold tool 100 and a "B" surface mold tool 200, combining with one another to form a molding apparatus for forming molded composite articles, such as composite building products. The "A" surface mold tool 100 and "B" surface mold tool 200 have opposed front sides 102 and 202, respectively, that mate with one another in facing relation as the "A" tool 100 and "B" tool 200 are brought together during a molding cycle. The front sides 102 and 202 of the "A" tool 100 and "B" tool 200 surround article molding regions 104 and 204, respectively. Each article molding region 104 of the "A" tool 100 combines with one article molding region 204 of the "B" tool 200 when the front sides 102 and 202 are mating to form a closed molding cavity where a blended feed composition is flowed to be molded into the finished composite article. One exemplary set of composite articles, or building products, formed by the "A" tool 100 and "B" tool 200 are shown in FIG. 5 in the form of composite shake shingles 300.

Each article molding region 104 of the "A" tool 100 has a body 106 bounded by a perimeter 108. Likewise, each article molding region 204 of the "B" tool 200 has a body 206 bounded by a perimeter 208. When the front sides 102 and 202 of the "A" tool 100 and "B" tool 200 are brought together, the perimeter 108 of one article molding region 104 of the "A" tool 100 mates with the perimeter 208 of one article molding region 204 the "B" tool 200. In this way, the article molding regions 104 and 204 are aligned with and facing one another in forming a closed molding cavity. The body 106 of the "A" tool article molding region 104 and/or the body 206 of the "B" tool article molding region 204 is recessed into the respective tool front side 102 and/or 202. This recess allows the article molding region perimeters 108 and 208 to establish an outer or side edge 302 for each molded composite shake shingle 300 formed within the article molding regions 104 and 204. The article molding regions 104 and 204 are designed, therefore, to set the shape and surface characteristics of the molded shingle 300. More specifically, the body 106 of the "A" tool article molding region 104 is configured to shape the bottom surface 304 of the molded shingle 300, and the body 206 of the "B" tool article molding region 204 is configured to shape the top surface 306 of the molded shingle 300. The exemplary "A" tool 100 and "B" tool 200 article molding regions 104 and 204, shown respectively in FIGS. 1 and 4, are designed to form shake shingles 300 with a specific surface texturing.

Therefore, each upper edge 110 of the article molding region perimeters 108 of the "A" tool 100 has a grooved pattern that mates with a grooved pattern 210 of the opposed "B" tool 200 in order to completely seal the respective closed molding cavity formed by the opposed article forming regions 104 and 204. A grooved pattern 112 matching the grooved pattern 210 of the "B" tool 200 may be continued upwardly on the front side 102 from each upper edge 110 of the "A" tool 100, in order to ensure a strong seal for the closed molding cavity. Additionally, a portion of the perimeter 108 and 208 surrounding each body 106 and 206 recessed into the respective tool front side 102 and 202, for example, at upper edge 110 for the "A" tool 100, may be textured to form a portion of the shingle side edge 302 with a corresponding texture.

Figure 5:
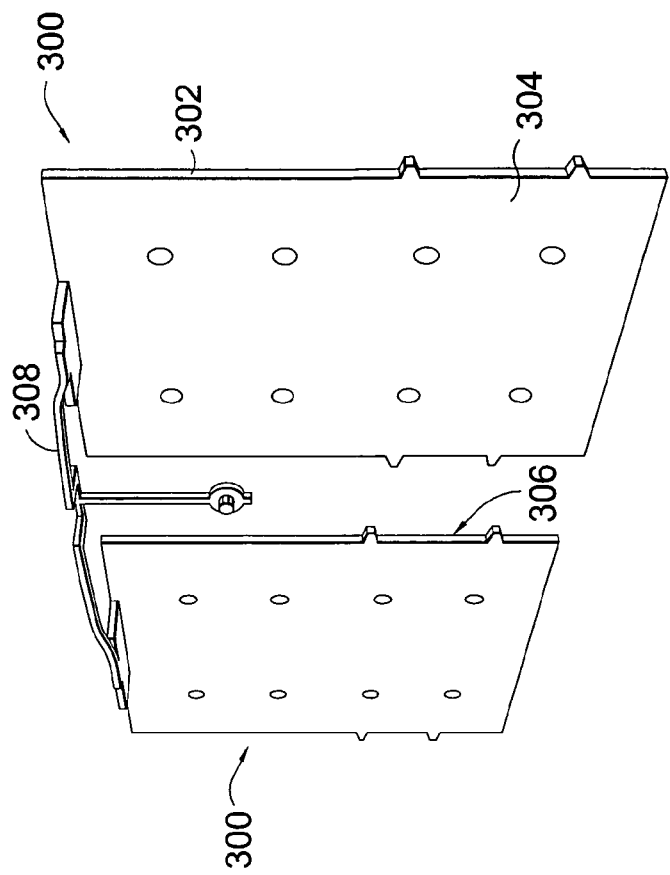
FIG. 5 is a perspective view of a pair of molded composite articles and attached gating piece formed by the mating of the "A" surface mold tool and "B" surface mold tool to form the article forming regions into closed molding cavities.

As can be seen in FIG. 5, the molded shingles 300 have a gating piece 308 formed on the bottom surfaces 304 thereof as a by-product of delivering the blended feed composition to the article molding regions 104 and 204. When the gating piece 308 is broken off at the interface with the shingle bottom surfaces 304, a vestige or mark is left behind as evidence of the molding process. Traditionally, this vestige is present on the side edge 302 of the molded article. Shake shingles, and other composite building products, are formed to replicate natural products, such as wood shakes or boards, and marks that evidence a molding process and remain exposed after the molded article is installed on a structure are undesirable. Therefore, a distribution channel 400 is formed at least in the "A" tool 100 to deliver the blended feed composition to the body 106 of each article molding region 104, so that any vestige is only present on the bottom surface 304 of the molded shingle 300.

Figure 2:
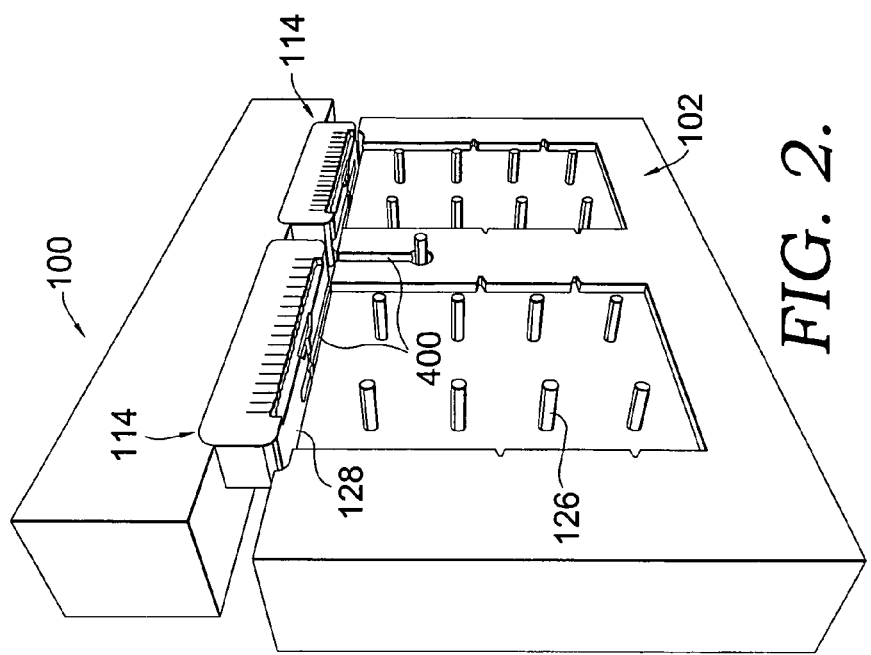
FIG. 2 is perspective view of one embodiment of the surface mold tool of FIG. 1 with the lifters displaced from the base of the surface mold tool to reveal the distribution channel for delivering a blended feed composition to each article forming region.

In the embodiment shown in FIGS. 1, 2 and 4, a port 214 is formed in the front side 202 of the "B" tool 200 outside of the article molding regions 204. The blended feed composition of at least a polymer (e.g., a thermoplastic, a rubber, etc.) and a filler (e.g., limestone, wood fiber, etc.) is delivered from a location where the one or more polymers are melted to a liquid form and blended with the filler (along with other additives such as colorants, suitable UV inhibitors, lubricants, etc.) to create a composition that can exhibit fluid flow characteristics for delivery to each article molding region 104 through the distribution channel 400. For example, one manner of creating the blended feed composition to form each composite shingle 300 relies on the use of a mixer and extruder. The raw ingredients for composite shingle formation are mixed in the mixer (e.g., a kinetic mixer) and then passed through the extruder. The mixture emerging from the extruder may be sliced into small pellets by a rotary knife so that the material can be more easily conveyed through piping under air pressure or suction to a storage location for use when needed (e.g., in a storage bin). Thereafter, the pellets are extracted from storage and fed a melting chamber along with other additives to create the blended feed composition. The port 214 may alternatively be formed in the front side 102 of the "A" tool 100 outside of the article molding regions 104. In either case, the distribution channel 400 in communication with the port 214 is formed through a recess in either or both the front sides 102 and 202 of the "A" tool 100 and "B" tool 200 outside of the respective article molding regions 104 and 204. For instance, in the embodiment shown in FIGS. 1, 2 and 5, the distribution channel 400 is formed in both the "A" Tool 100 and the "B" tool 200 through the mating contact between the respective front sides 102 and 202.

The specific pathway of the distribution channel 400, in one embodiment, is dictated by the implementation of lifters 114 in the "A" tool 100. The lifters 114 are positioned within a gap 116 formed between upper and lower base portions 118 and 120 of the "A" tool 100, and combine with the lower base portion 120 to form the article molding regions 104. The portion of each body 106 of the article molding region 104 where the distribution channel 400 interfaces with the body 106 is formed by the lifter 114. Mating with a front face 122 of each lifter 114 when the "A" tool 100 and "B" tool 200 are brought together, such that the respective article molding regions 104 and 204 form closed molding cavities, are recess portions 216 in the front side 202 of the "B" tool 200.

Figure 3:
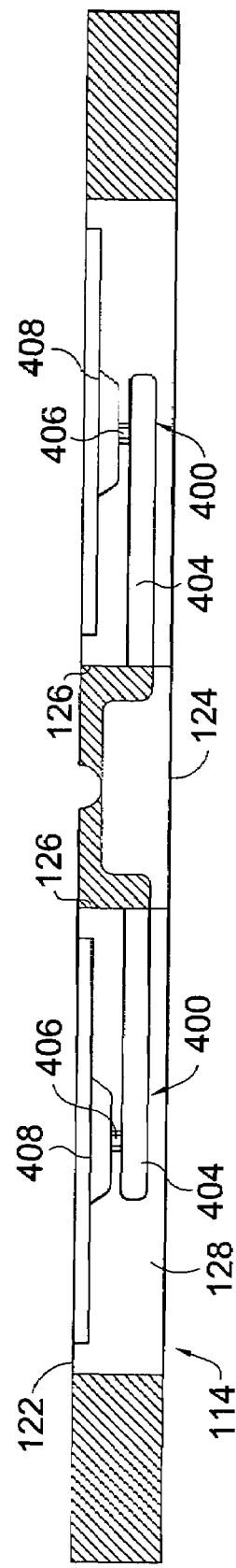
FIG. 3 is a cross-sectional view taken along line 3-3 showing the pathway of the distribution channel in the lifters to reach adjacent article forming regions.

With continued reference to FIGS. 1, 2 and 4, and with reference to FIG. 3, the distribution channel 400 extends upwardly from the port 214 (or location opposite the port 214 on the "A" tool 100) to reach a lateral portion 402 of the channel 400. A divider 218 formed between the recess portions 216 mates with a recessed block 124 of the "A" tool 100 to form the lateral portion 402 when the "A" tool and "B" tool front sides 102 and 202 are brought together during the molding process. From this point, the channel lateral portion 402 extends in opposed directions and then rearwardly along opposed sidewalls 126 of the lifters 114 to reach primary channel portions 404 formed in the bottom surface 128 of the lifters 114. Continuing through the distribution channel 400, the primary channel portions 404 each open through a neck 406 into a diverging channel portion, or downstream terminus 408, for the channel 400. Each downstream terminus 408 opens directly into the body 106 of the respective article molding region 104 to deliver the blended feed composition into the closed molding cavity. In this orientation, the blended feed composition is molded within the distribution channel 400 and the closed molding cavity formed by each set of opposed article molding regions 104 and 204 into the gating piece 308 and the composite shingles 300, as seen in FIG. 5. The gating piece 308 is therefore attached with the shingle bottom surfaces 304, and not the side edge 302 or top surface 306 of the shingle 300. Preferably, the downstream terminus 408 of the distribution channel 400 is spaced from the perimeter 108 of each article molding region 104, as can be seen in FIGS. 1 and 2.

Once a sufficient amount of time has passed for molded shingle 300 curing within the closed molding cavities (e.g., under elevated heat and pressure), the front sides 102 and 202 of the "A" tool 100 and "B" tool 200 are separated. The lifters 114, preferably hydraulically actuated, are moved out from the front side 102 of the "A" tool 100 and away from the upper and lower base portions 118 and 120 thereof to fully reveal the distribution channel 400 and gating piece 308 formed therein, as seen in FIG. 2. Hydraulic pins 126 extend from the body 106 of each article molding region 104 to eject the molded shingles 300 from the regions 104 while suction arms or other robot arms (not shown) may use a vacuum draw to capture the shingles 300 and move them to a location where the gating piece 308 is separated from the shingles 300. After this separation step, each molded shingle 300 is transported (e.g., by a conveyor) to a packaging location where multiple shingles 300 may be packaged together for storage or shipment.

It can be seen, therefore, that the molding apparatus formed by the "A" surface mold tool 100 and a "B" surface mold tool 200 facilitates the molding of composite building products 300 where a gating piece 308 is formed on the bottom surface 304 of a molded article. Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A molding apparatus comprising:
    a first surface mold tool having a front side with at least one article molding region formed into the front side, each article molding region having a body adapted for molding at least a top surface of a composite building product, wherein the body is bounded by a perimeter that defines an outer edge of the composite building product;
    a second surface mold tool, which mates with the first surface mold tool, having a front side with at least one article molding region formed into the front side, each article molding region of the second surface mold tool having a body adapted for molding at least a portion of a bottom surface of the composite building product, wherein the body is bounded by a perimeter that defines outer side edges forming an opening for the composite building product;
    at least one lifter corresponding to each second surface mold tool, the lifter having a front side and an article molding region formed into the front side, each article molding region of the lifter having a body adapted to cooperate with a corresponding article molding region of the second surface mold tool to form the remainder of the bottom portion of the composite building product, the lifter being positioned adjacent the second surface mold tool and cooperating with the second surface mold tool to form at least one article molding region with the second surface mold tool, wherein at least one closed molding cavity is formed by bringing together the first surface mold tool and the combined second surface mold tool and the at least one lifter in mating relationship with front sides thereof contacting one another, such that the respective article molding regions thereof cooperatively form at least one closed molding cavity within which at least one of the composite building products is formed; and
    a distribution channel formed in at least the second surface mold tool and the lifter, the distribution channel having a receiving terminus and a downstream terminus, which is opposite to the receiving terminus and terminates at the article molding region of the lifter,
        wherein from the receiving terminus the channel extends near parallel to an edge of the article molding region of the second surface mold tool, until the distribution channel reaches a position in the second surface mold tool that is aligned with the lifter;
        wherein, when the distribution channel reaches the position, a path of the distribution channel changes directions and extends into the lifter;
        wherein, after the distribution channel extends into the lifter, the distribution channel extends near parallel to the body of the lifter that is adapted to cooperate with a corresponding article molding region of the second surface mold tool;
        wherein, upon reaching a second position that is aligned with a middle of the body of the lifter, the distribution channel extends toward the body of the lifter until the distribution channel ends at the downstream terminus; and
    wherein the distribution channel is adapted to form a gating piece on the bottom surface of each composite building product with the outer edge of each composite building product being free from attachment with the gating piece.

2. The apparatus of claim 1, wherein at least one of the first and second surface mold tools includes a port outside of each article molding region and in communication with the distribution channel, the port being adapted to deliver a flowing composition of a polymer and a filler to the distribution channel.

3. The apparatus of claim 1, wherein the terminus of the distribution channel is spaced from the perimeter of the at least one article molding region of the second surface mold tool.

4. In a molding apparatus including opposed first and second surface mold tools each including a front side having an article molding region mateable with one another to form a closed molding cavity within which a molded composite building product is formed, the improvement comprising:

the article molding region of at least the first surface molding tool having a body bounded by a perimeter that defines an outer edge for the molded composite building product;

the second surface mold tool being formed of a base and a lifter that cooperatively form the article molding region on the second surface mold tool by bringing together the base and the lifter with front sides thereof contacting one another, wherein the front side of the lifter has an article molding region formed therein, and wherein the front side of the base has an article molding region formed therein that is adapted for molding at least a portion of a bottom surface of the molded composite building product, and the article molding region of the base is bounded by a perimeter that defines outer side edges of the molded composite building product; and a distribution channel formed in at least the base and the lifter of the second surface mold tool, the distribution channel having a receiving terminus and a downstream terminus, which is opposite to the receiving terminus and terminates at the article molding region of the lifter, wherein from the receiving terminus the channel extends near parallel to an edge of the article molding region of the base, until the distribution channel reaches a position in the base that is aligned with the lifter;

wherein, when the distribution channel reaches the position, a path of the distribution channel changes directions and extends into the lifter;

wherein, after the distribution channel extends into the lifter, the distribution channel extends near parallel to the article molding region of the lifter that is adapted to cooperate with a corresponding article molding region of the base;

wherein, upon reaching a second position that is aligned with a middle of the article molding region of the lifter, the distribution channel extends toward the article molding region of the lifter until the distribution channel ends at the downstream terminus; and wherein the distribution channel is adapted to form a gating piece on the bottom surface of the composite building product with the outer edge of each composite building product being free from attachment with the gating piece.

* * * * *